Figure 1:
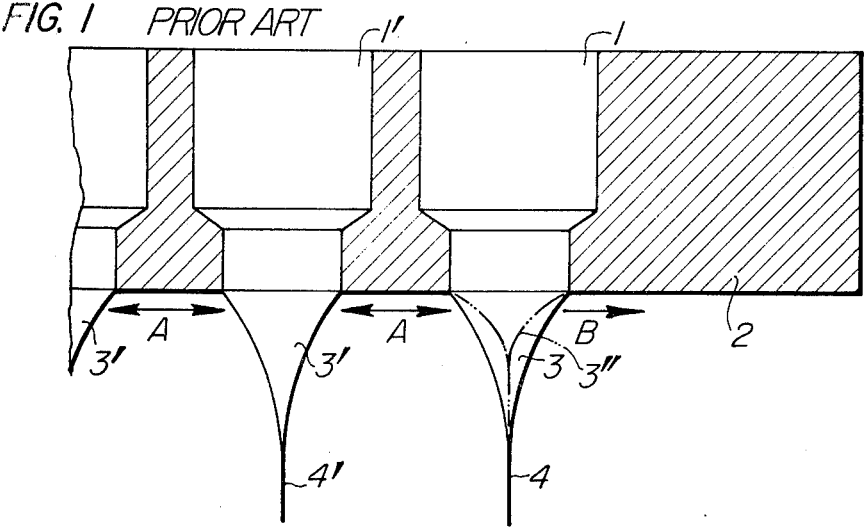

United States Patent [19]

Shono et al.

[11] 4,119,420
[45] Oct. 10, 1978

[54] ORIFICE PLATE FOR USE IN BUSHING FOR SPINNING GLASS FIBERS

[75] Inventors: Hiroaki Shono; Toshio Noji; Shinzo Ishikawa; Isao Wakasa, all of Fukushima, Japan

[73] Assignee: Nitto Boseki Co., Ltd., Fukushima, Japan

[21] Appl. No.: 822,337

[22] Filed: Aug. 5, 1977

[30] Foreign Application Priority Data

Aug. 20, 1976 [JP] Japan ................................ 51-99428

[51] Int. Cl.$^2$ ........................................... C03B 37/02
[52] U.S. Cl. ...................................... 65/1; 76/107 S; 425/72 S
[58] Field of Search ...................... 65/1, 2, 11 W, 12; 76/107 S; 455/72 S

[56] References Cited

U.S. PATENT DOCUMENTS

| | | |
|---|---|---|
| 3,514,841 | 6/1970 | Woodward et al. .................. 65/1 X |
| 3,526,487 | 9/1970 | Bour ........................................ 65/1 |
| 3,905,790 | 9/1975 | Strickland ............................ 65/12 X |
| 3,982,915 | 9/1976 | Coggin ................................. 65/12 X |

FOREIGN PATENT DOCUMENTS

| | | |
|---|---|---|
| 483,857 | 2/1973 | Japan ............................................ 65/1 |
| 517,218 | 1/1976 | Japan ............................................ 65/1 |

Primary Examiner—Robert L. Lindsay, Jr.
Attorney, Agent, or Firm—Jay L. Chaskin

[57] ABSTRACT

Disclosed is an orifice plate for use in a bushing for spinning glass fibers having a number of orifices each of which consists of two cascaded coaxial cylindrical bores of different diameters, one of which opens in the upper surface of the orifice plate to constitute a molten-glass inlet-side bore, while the other opens in the lower surface of the orifice plate to constitute a molten-glass outlet-side bore.

The orifices are so densely arranged as would allow joining of molten glass cones formed at adjacent orifices if a suitable countermeasure such as a cooling by air flow were not taken. In order to compensate the reduction of flow rate of the molten glass through the outermost orifices attributable to a larger ratio of heat radiation to heat absorption at the outermost orifices than at the inner orifices, a specific dimensional relationship is provided between the outermost and the inner orifices such that glass cones of the same size and shape with those of glass cones of inner orifices are formed at the outermost orifices irrespective of the difference of the heat radiation between the outermost and the inner orifices, thereby to decrease the frequency of occurrence of breakage of filaments at the outermost glass cones which has often taken place to interrupt the continuous spinning.

5 Claims, 4 Drawing Figures

ORIFICE PLATE FOR USE IN BUSHING FOR SPINNING GLASS FIBERS

The present invention relates to an orifice plate for use in a bushing for spinning glass fibers and, more particularly, to an improvement of an orifice plate provided with a number of orifices which are arranged so densely that the molten glass cones constituted by masses of molten glass having passed through respective orifices tend to join one another to finally cause a flooding of molten glass under the orifice plate and each of which consists of two cascaded coaxial bores of different diameters, as disclosed in our copending application Ser. No. 814,436 filed July 11, 1977.

In order that the spinning may be successfully performed by employing the orifice plate of the kind described, it has been proposed in U.S. Pat. No. 3,905,790 to apply an air flow upwardly onto the lower surface of the orifice plate from air nozzles disposed below the orifice plate, so as to cool the orifice plate and the surface of the molten glass cones formed of the molten glass having passed through the orifices, thereby to increase the viscosity of the molten glass to avoid the joining of the cones.

However, it has been often experienced that the filaments spun from glass passed through orifices located at the peripheral or outermost portion of the orifice plate tend to be broken, as compared with filaments spun from glass passed through orifices located inside of the outermost orifices. Thus, in many cases, the spinning has had to be interrupted due to the breakage of the filaments from the outermost orifices, in two or three minutes after the starting of the spinning. As a matter of fact, it has proved as a result of a series of experiments and study on the thickness distribution of the filaments, that the filaments provided through the outermost orifices have diameters smaller than those of the filaments obtained through the inner orifices and, accordingly, are more likely to be broken.

The difference of the diameter of the filaments are attributable, as will be described later, to an uneven heat radiation/absorption condition for the molten glass cones.

Under these circumstances, the present invention aims at overcoming above described problems inherent in the prior arts by providing an improved orifice plate.

It is therefore an object of the invention to equalize the diameters of filaments, through avoiding uneven heat radiation/absorption condition, so as to ensure stable spinning of the glass fibers over a sufficiently long period.

To this end, according to the invention, there is provided an orifice plate adapted to be incorporated in a bushing for spinning glass fibers having a plain surface and a number of densely arranged orifices each of which consists of two cascaded coaxial cylindrical bores of different diameters, wherein there exists a specific relationship between the outermost orifices and inner orifices located at the inner side of the outermost orifices represented by the following equation of:

$$\gamma_s = 0.57 \gamma_u \text{ to } 0.86 \gamma_u$$

where, $\gamma_s$ is a variable determined in accordance with dimensions of parts of each outermost orifice, while $\gamma_u$ is a variable determined in accordance with the dimensions of parts of each inner orifice, said variables $\gamma_s$ and $\gamma_u$ being given by the following equations, respectively, $$\gamma_s = \frac{L_x}{x^4} + \frac{L_y}{y^4} + \frac{(x^3 - y^3)\tan\theta}{6x^3y^3}$$

$$\gamma_u = \frac{L_{x'}}{x'^4} + \frac{L_{y'}}{y^4} + \frac{(x'^3 - y'^3)\tan\theta}{6x'^3y^3}$$

where, $x$ and $x'$ represent the diameters of cylindrical bores of the outermost and inner orifices, respectively, at the molten glass inlet side, $L_x$ and $L_{x'}$ represent the axial lengths of the cylindrical bores of the outermost and inner orifices, respectively, at the molten glass inlet side, $y$ represents the diameter of the cylindrical bores of the outermost and inner orifice, respectively, at the molten glass outlet side, $L_y$ and $L_{y'}$ represent the axial lengths of the cylindrical bores of the outermost and inner orifices, respectively, at the molten glass outlet side, and $\theta$ denotes an angle formed between a plane parallel with the plane of the orifice plate and a tapered intermediate section through which the two cylindrical bores of the molten glass inlet and outlet sides are connected to each other in the outermost and the inner orifices.

Figure 2:
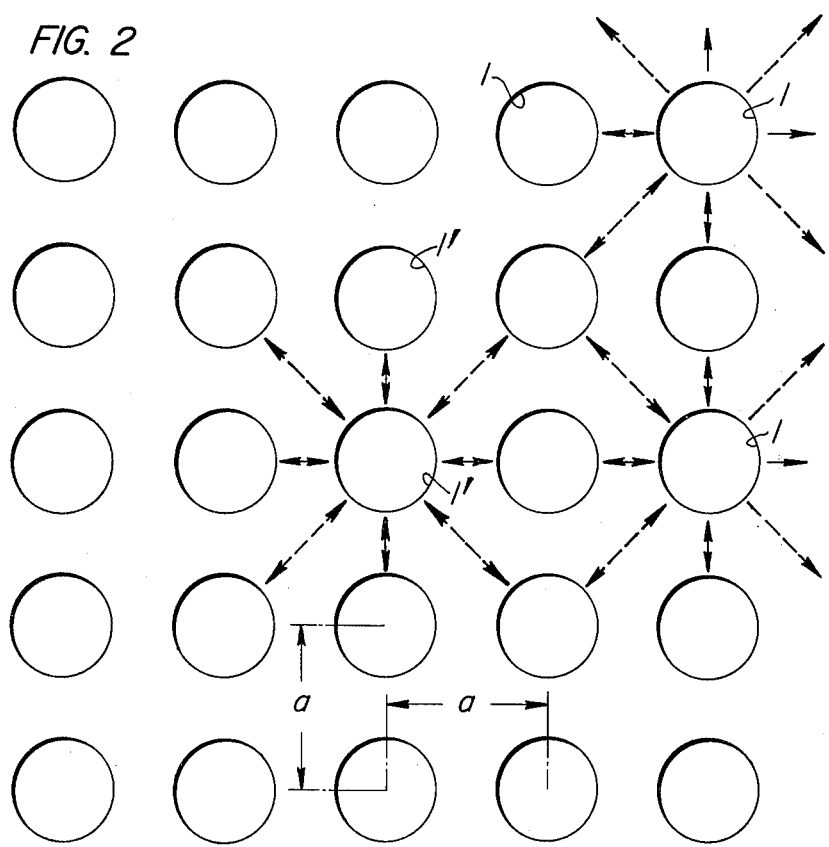
Figure 3:
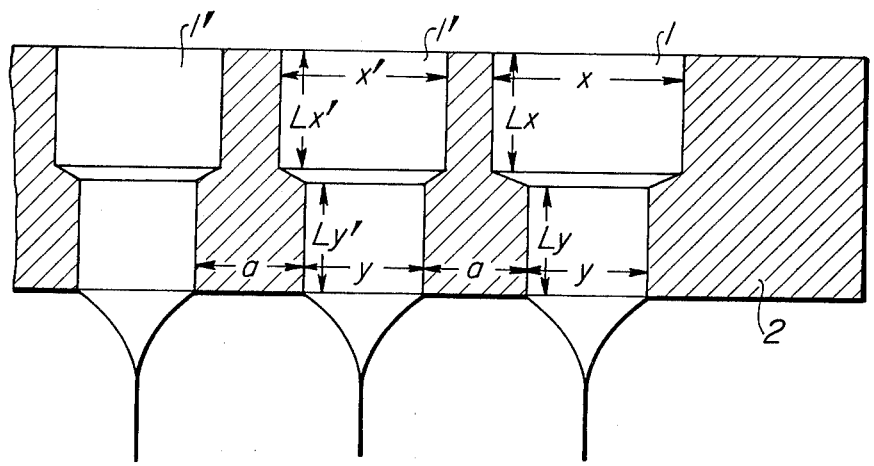
Figure 4:
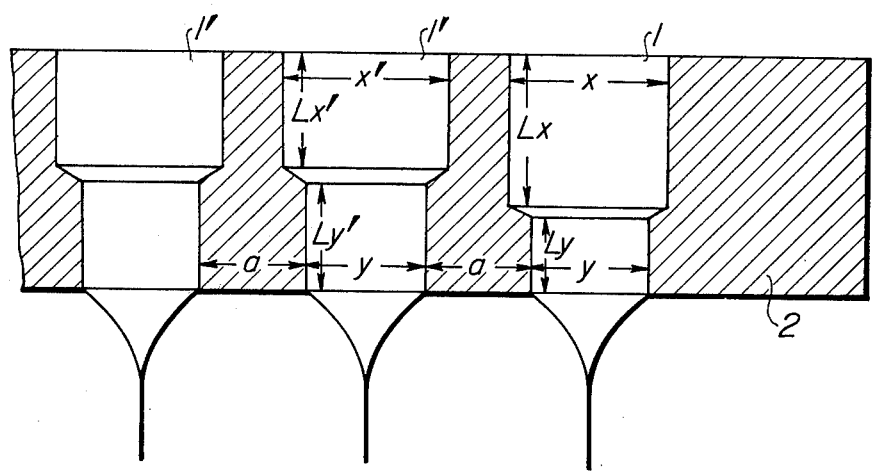

These and other objects, as well as advantageous features of the invention will become clear from the following description of the preferred embodiments taken in conjunction with the attached drawings in which:

FIG. 1 is a partial sectional view of a prior orifice plate having orifices each of which consists of two cascaded coaxial cylindrical bores of different diameters, FIG. 2 is an illustration explanatory of the heat radiation/absorption condition of the orifices in the orifice plate of FIG. 1, and FIG. 3 and FIG. 4 are partial sectional views of orifice plate embodying the invention.

Before turning to the description of the preferred embodiment of the invention, an explanation will be made as to the prior arts with specific reference to FIGS. 1 and 2.

As stated before, the filaments spun from the molten glass cones located at the peripheral portion of the orifice plate, i.e. of the outermost orifices, are more apt to be broken than the filaments obtained through orifices located at the inner side of the outermost orifices due to the difference in the heat radiation/absorption conditions.

To explain in more detail, referring to FIG. 1, the masses of molten glass discharged through orifices 1, 1' forms cones 3, 3' suspended from the lower surface of the orifice plate 2, and are finally spun into filaments 4, 4'. During the spinning, there exists a heat radiation/absorption relationship as indicated by arrows A, between adjacent cones 3' and 3' under orifices 1' and 1' which are located at the inner side of the outermost orifice 1. However, as to the cone 3 under the outermost orifice 1, although the substantially equivalent heat radiation/absorption relationship A is observed between the cone 3 and the adjacent in side cone 3', only a heat radiation as represented by an arrow B is observed toward the outside of the orifice plate.

Consequently, the outermost cones 3 suffer from a larger loss of heat as compared with the inner cones 3'. Therefore, the molten glass cones from the outermost orifices come to have a lower temperature and, accordingly, a higher viscosity over the other, i.e. the inner cones. The higher viscosity directly leads to a reduced flow rate of the molten glass through the outermost orifices, due to a correspondingly increased flow resistance, so that the molten glass cones 3 under the outermost orifices 1 may be stabilized in a more reduced size, as indicated by two-dot chain line 3'' in FIG. 1.

Thus, when tensile forces are uniformly applied to the molten glass cones for the purpose of the spinning, the glass cones issued from the outermost orifices cannot sustain the tensile force, because of the reduced rate of supply, and are finally broken.

FIG. 2 shows this heat radiation/absorption relation in more detail. Supposing that the orifices are disposed at a constant pitch $a$ in two orthogonal directions, a relationship as shown in the following table is derived, between the outermost orifices 1 and the inner orifices 1'.

| Position of orifices | Number of orifices at a distance $a$ | Number of orifices at a distance $\sqrt{2}a$ | Ratio of heat radiation to absorption |
|---|---|---|---|
| Inner orifices 1' | 4 | 4 | 1 |
| Outermost orifices 1 | 3 | 2 | 0.67 |

As will be directly read from the above table, the outermost orifice can absorb heat by an amount which rates only 67% of that received by the inner orifices. This means that the molten glass issued from the outermost orifices suffers from a larger rate of heat radiation for the amount of heat received to have a lower temperature than those obtained from the inner orifices. Thus the temperature distribution over the orifice plate is largely influenced by the condition of heat radiation, partly because the orifices are arrayed highly densely, i.e. the glass cones are located extremely closed to one another, and partly because the forced convection of cooling air for maintaining the shape of cones is uniformly applied to all of the orifices, resulting in a substantial temperature variation over the orifice plate.

The invention aims at overcoming the above described drawbacks of the prior art by providing an improved orifice plate which will be detailed hereinafter.

Referring to FIG. 3, an orifice plate embodying the invention has a number of orifices 1, 1' each of which consisting of two cascaded coaxial cylindrical bores of different diameters connected through a tapered intermediate section. The outermost orifices 1 and the inner orifices 1' located at the inner side of the outermost orifices have an equal diameter $y$ at the molten-glass outlet side. The axial lengths $L_y$ and $L_{y'}$ of the outlet side bores of the outermost and inner orifices 1, 1' are selected to be equal to each other. Also, the distance between the walls of the outlet side bores of adjacent inner orifices and the distance between the walls of outlet side bores of the outermost orifices and the neighbouring inner orifices are made to be equal and are denoted by $a$.

In order to reduce the frictional resistance to which the flow of molten glass is subjected when it passes through the outermost orifices, the diameter $x$ of the inlet side bores in the outermost orifices is selected to be larger than that $x'$ of the inner bores, while the inlet side bores of the outermost and inner orifices have an equal axial length $L_x$ and $L_{x'}$. Alternatively, as shown in FIG. 4, not only the outlet-side bores of the outermost and inner orifices 1, 1' have a common diameter $y$ but also the diameters $x$ and $x'$ of the inlet-side bores of both orifices 1, 1' may be made equal, while the axial length $L_x$ of the inlet-side bores of the outermost orifices 1 may be selected to be larger than that $L_{x'}$ of the inner orifices 1', so that the outlet-side bores of the outermost orifices 1 may have an axial length $L_y$ which is smaller than that $L_{y'}$ of the outlet-side bores of the inner orifices 1'.

It will be seen that, according to the arrangement of FIGS. 3 and 4, a smaller frictional resistance is presented by the outermost orifices than by the inner orifices. The same condition can be obtained also by suitably combining the arrangements of FIGS. 3 and 4. Thus, the flow rate of molten glass passing through the outermost orifice becomes larger than that through the inner orifice due to less frictional resistance. As a result, the increment of the flow rate through the outermost orifices compensates the larger ratio of heat radiation to heat absorption at the outermost orifices than at the inner orifices, thereby to ensure molten glass cones at the outermost orifices of a size substantially equal to that of the molten glass cones obtainable at the inner orifices.

On the basis of the principle as stated above, the inventors have reached a conclusion, as a result of intense study and experiments, that the most satisfactory result is obtained when a relationship represented by the following equation exists between the outermost and inner orifices.

$$\gamma_s = 0.57 \gamma_u - 0.86 \gamma_u$$

In the above equation $\gamma_s$ is a variable which is determined in accordance with the dimensions of two cylindrical bores of the outermost orifice, while $\gamma_u$ is also a variable which is determined by the dimensions of the two cylindrical bores of the inner orifices. More specifically, $\gamma_s$ and $\gamma_u$ are variables which satisfy the following equations respectively.

$$\gamma_s = \frac{L_x}{x^4} + \frac{L_y}{y^4} + \frac{(x^3 - y^3)\tan\theta}{6x^3y^3}$$

$$\gamma_u = \frac{L_{x'}}{x'^4} + \frac{L_{y'}}{y^4} + \frac{(x'^3 - y^3)\tan\theta}{6x'^3y^3}$$

In the above equations, symbols denote the dimensions of parts of orifices as shown in FIGS. 3 and 4 and listed in the following table.

|  | Outermost Orifices | Inner Orifices |
|---|---|---|
| Dias. of Inlet-side Bores of Orifices | x | x' |
| Length of Inlet-side Bores of Orifices | $L_x$ | $L_{x'}$ |
| Dias. of Outlet-side Bores of Orifices | y |  |
| Lengths of Outlet-side Bores of Orifices | $L_y$ | $L_{y'}$ |
| Angle at which Tapered Intermediate Section Intersects Plane of Orifice Plate | $\theta$ |  |

The frictional resistance by which the flow of molten glass is encountered as it passed through the orifice becomes larger, as these variables $\gamma_s$ and $\gamma_u$ get larger, so that the flow rate is reduced while, to the contrary, the frictional resistance is decreased to allow a larger flow rate, as these variables get smaller.

It has been confirmed that when $\gamma_s$ is larger than 0.86 $\gamma_u$, the rate of supply of molten glass to the outermost orifices becomes insufficient thereby to make the molten glass cones smaller at the outermost orifices than at the inner orifices, so that the chance of breakage of filaments is enhanced at the outermost orifices.

On the other hand, when $\gamma_s$ is smaller than 0.57 $\gamma_u$, the rate of supply of the molten glass through the outermost orifices becomes excessive thereby to cause the joining of glass cones formed at the outermost orifices with the inner glass cones.

As mentioned before, the subject orifice plate has referred to as having a number of orifices arrayed at such a small pitch i.e. a high density as would naturally cause the joining of the glass cones if there were no suitable counter-measure. Although the pitch cannot be simply determined since it depends on the various factors such as the amount of the molten glass in the spinning hearth, composition of the glass, melting point of the glass, spinning temperature, shape of the orifice, spinning velocity, flow rate of cooling air applied to the orifice plate, velocity of the cooling air and so on, it would not involve substantial error to say that the pitch at which the orifices are arrayed in the orifice plate of the invention is typically 2.0 mm or smaller, as measured at the closer sides of the walls of the adjacent orifices.

Assuming that the distance between the closer sides of the walls of adjacent orifices is 1.0 mm, the orifice plate designed to meet the requisites of the invention can provide molten glass cones at the outermost orifices, which are of the same size with those obtained at the inner orifices. In addition, since any adjacent orifices are arrayed at a constant pitch, the chance of mutual contact of the molten glass cones becomes even all over the area of the orifice plate, so that a stable continuous spinning operation can be effected without joining of the glass cones.

Needless to say, the invention can be carried out, not only in the form of a bushing having a rectangular orifice plate, but also with a bushing having a circular orifice plate. In the latter case, the orifices may be disposed along a number of concentric circles assumed on the circular orifice plate.

The stated advantages of the invention will be more clearly recognized from the following practical examples.

EXAMPLE 1

An orifice plate was prepared to meet the requisites of the invention, in accordance with the conditions shown in the following tables.

| | | |
|---|---|---|
| dimension of orifice plate | 250 × 46 × 2 mm | |
| material of orifice plate | 80 Pt – 20 Rh | |
| number of orifices | 2008 | |
| distance between centers of adjacent orifices | 1.90 mm | |
| spinning rate | 800 – 1000 g/min. | |
| take-up speed | 300 – 1000 m/min. | |

| | | Inner Orifices | Outermost Orifices |
|---|---|---|---|
| I | Dias. of Inlet-side Bores of Orifices | 1.50 mm | 1.70 mm |
| II | Axial Lengths of Inlet-side Bores of Orifices | 1.34 mm | 1.34 mm |
| III | Dias. of Outlet-side Bores of Orifices | 1.00 mm | 1.00 mm |

-continued

| | | Inner Orifices | Outermost Orifices |
|---|---|---|---|
| IV | Axial Lengths of Outlet-side Bores of Orifices | 0.51 mm | 0.46 mm |
| V | Angle at which Tapered Intermediate Section of Orifice intersects Plane of Orifice Plate | 30° | 30° |
| VI | III/I | 0.67 | 0.59 |
| VII | Distances Between Walls of Adjacent Orifices at Molten-glass outlet side | 0.90 mm | |
| VIII | Variables of Orifices | 0.842 | 0.697 |
| | ratio of variables $\frac{\gamma_s}{\gamma_u} = 0.83$ | | |

Another orifices plate for the reference purpose was prepared in accordance with the same conditions but to have outermost and inner orifices of the same shape and size as is usual in the conventional arrangement. Then, a series of test operations were conducted to compare the frequency of the occurrence of the breakage of the filaments at the outermost orifices between both orifice plates. The result of the tests was as shown in the following table.

| Take-up Speeds | 300 m/min. | 600 m/min. | 1000 m/min. |
|---|---|---|---|
| Orifice Plate of Invention | one breakage per 6 hours | one breakage per 5 hours | one breakage per 2 hours |
| Orifice Plate of Prior Art | one breakage per 15 min. | one breakage per 4 min. | one breakage per 5 sec. |

EXAMPLE 2

An orifice plate was prepared to meet the requisites of the invention in accordance with the conditions as shown in the following tables.

| | |
|---|---|
| dimension of orifice plate | 380 × 52 × 2 mm |
| material of orifice plate | 90 Pt – 5 Au – 5 Pd |
| number of orifices | 4000 |
| distance between centers of adjacent orifices | 1.85 mm |
| spinning rate | 1500 g/min. |
| take-up speed | 300 – 900 m/min. |

| | | Inner Orifices | Outermost Orifices |
|---|---|---|---|
| I | Dias. of Inlet-side Bores of Orifices | 1.40 mm | 1.60 mm |
| II | Axial Lengths of Inlet-side Bores of Orifices | 0.99 mm | 1.33 mm |
| III | Dias. of Outlet-side Bores of Orifices | 1.10 mm | 1.10 mm |
| IV | Axial Lengths of Outlet-side Bores of Orifices | 0.92 mm | 0.50 mm |
| V | Angle at which Tapered Intermediate Section of Orifice Intersects Plane of Orifice Plate | 30° | 30° |
| VI | III/I | 0.79 | 0.69 |
| VII | Distance Between Walls of Adjacent Orifices at Molten-glass outlet side | 0.75 mm | |
| VIII | Variables of Orifices | 0.923 | 0.554 |
| | ratio of variables $\frac{\gamma_s}{\gamma_u} = 0.600$ | | |

For a purpose of comparison, another orifice plate was prepared in the same condition but to have outermost and inner orifices of same size and shape, as is usual in the conventional arrangement. Then, similar tests were conducted to compare the frequencies of the breakage of the filaments at the outermost orifices between both orifice plates and obtained a result as shown in the following table.

| Take-up Speeds | 300 m/min. | 600 m/min. | 900 m/min. |
|---|---|---|---|
| Orifice Plate of Invention | one breakage per 4 hours | one breakage per 4 hours | one breakage per 2 hours |
| Orifice Plate of Prior Art | one breakage per 10 min. | one breakage per 2 min. | one breakage per 5 sec. |

From the comparisons as described in connection with the Examples 1 and 2, it will be seen that the frequency of the breakage of filaments at the outermost orifices can be much decreased, as compared with conventional arrangement, thereby to render the spinning operation stable and continuous.

Having described the invention through specific embodiments, it is to be noted here that various changes and modifications may be imparted thereto without substantially departing from the scope of the invention which is deliminted solely by the appended claims.

What is claimed is:

1. An orifice plate for use in a bushing for spinning glass fibers having a plain lower surface and provided with a number of densely arranged orifices each of which consists of two cascaded coaxial cylindrical bores of different diameters, one of said bores opening in the upper surface of said orifice plate to constitute a molten-glass inlet-side bore, while the other bore opening in said lower surface to constitute a molten-glass outlet-side bore, characterized in that there exists a relationship between the outermost orifices and the inner orifices located at the inside of the outermost orifices, said relationship being represented by the following equation of:

$$\gamma_s = 0.57 \, \gamma_u \text{ to } 0.86 \, \gamma_u$$

where, $\gamma_s$ and $\gamma_u$ are variables determined in accordance with the dimensions of the bores of said outermost and inner orifices, respectively, and given by the following equations of:

$$\gamma_s = \frac{L_x}{x^4} + \frac{L_y}{y^4} + \frac{(x^3 - y^3)\tan\theta}{6x^3 y^3}$$

$$\gamma_u = \frac{L_{x'}}{x'^4} + \frac{L_{y'}}{y^4} + \frac{(x'^3 - y^3)\tan\theta}{6x'^3 y^3}$$

where, $x$ and $x'$ are diameters of said inlet-side bores, respectively, of said outermost and inner orifices, $L_x$ and $L_{x'}$ are axial lengths of said inlet-side bores, respectively, of said outermost and inner orifices, $y$ is the diameter of said outlet-side bores of said outermost and inner orifices, $L_y$ and $L_{y'}$ are axial lengths of said outlet-side bores, respectively, of said outermost and inner orifices, and $\theta$ is the angle at which a tapered intermediate section through which said two cylindrical bores in each orifice are connected intersects a plane parallel with the orifice plate.

2. An orifice plate as claimed in claim 1, wherein said axial lengths $L_x$ and $L_{x'}$ of said inlet-side bores as well as the axial lengths $L_y$ and $L_{y'}$ of said outlet-side bores, are selected to be equal to each other, while said diameter $x$ of the inlet-side bore of said outermost orifices is selected to be greater than that $x'$ of the inner orifices.

3. An orifice plate as claimed in claim 1, wherein said diameters $x$ and $x'$ of said inlet-side bores of outermost and inner orifices are equal to each other, while said axial length $L_x$ of said inlet-side bores of said outermost orifices is selected to be greater than that $L_{x'}$ of said inner orifices, and said axial length $L_y$ of said outlet-side bores of said outermost orifices is selected to be smaller than that $L_{y'}$ of said inner orifices.

4. An orifice plate as claimed in claim 1, characterized in that said orifice plate has a rectangular profile.

5. An orifice plate as claimed in claim 1, characterized in that said orifice plate has a circular profile, said orifices being disposed along a plurality of concentric circles supposed on said orifice plate at a constant radial pitch.

* * * * *